United States Patent [19]

Peruglia

[11] 3,738,713
[45] June 12, 1973

[54] VEHICLE ANTI-SKID BRAKING APPARATUS

[75] Inventor: Marco Peruglia, Turin, Italy

[73] Assignee: FIAT Societa per Azioni, Turin, Italy

[22] Filed: June 8, 1972

[21] Appl. No.: 260,867

[52] U.S. Cl............................ 303/21 F, 188/181 A
[51] Int. Cl............................................... B60t 8/12
[58] Field of Search..................... 303/21 F, 13, 68; 188/181 A

[56] References Cited
UNITED STATES PATENTS

| | | | |
|---|---|---|---|
| 3,459,204 | 8/1969 | Perrino | 303/21 F X |
| 3,588,189 | 6/1971 | Cumming | 303/21 F |
| 3,682,514 | 8/1972 | Oberthür | 303/10 X |
| 3,695,734 | 10/1972 | Hennig et al. | 303/21 F |

*Primary Examiner*—M. Henson Wood, Jr.
*Assistant Examiner*—Michael Mar
*Attorney*—Richard C. Sughrue, Gideon Franklin Rothwell, John H. Mion et al.

[57] ABSTRACT

A distributor for an hydraulic braking system having an anti-skid device is disclosed. The distributor operates to route the hydraulic braking fluid through different paths, so that the device has two different modes of operation, in dependence on whether a vehicle to which the braking system is fitted is travelling over wet or dry ground; this is detected by the different braking pressures which are required to cause the wheels to reach an incipient skid state. The distributor comprises three chambers two of which communicate through a ball valve and the third of which is connected to the brake actuators of the system and to an electrovalve which is controlled by an antiskid control device to connect the said third chamber to the master cylinder, which acts as source of braking pressure, under normal braking conditions, and to one of the two communicating chambers when an incipient skid is detected. The other of the two communicating chambers is connected to a reservoir and the communication between these two chambers is controlled by a ball valve under the action of a piston which is moved to close the ball valve when the pressure in the third chamber, and thus the braking pressure, exceeds a predetermined threshold value. In this case the braking pressure is discharged slowly through a restrictor throttle when an incipient skid is detected whereas if the braking pressure is below the threshold when an incipient skid occurs, indicating wet or slippery ground, the ball valve is open and the braking pressure is released rapidly through the ball valve to the reservoir.

3 Claims, 3 Drawing Figures

VEHICLE ANTI-SKID BRAKING APPARATUS

BACKGROUND OF THE INVENTION

The present invention relates to an anti-skid braking system for motor vehicles, having an anti-skid hydraulic actuator which is compact and efficient.

Hydraulic anti-skid braking systems for motor vehicles in which the hydraulic circuit has various modes of operation, according to the type of ground encountered by the vehicle are known as such. In general, however, although such prior braking systems, operate in the desired manner, to provide two modes of anti-skid action during braking in such a way as not to give rise to jerks or jolts which might deleteriously affect the braking or the steering as a result of too rapid changes in braking pressure they do require a great many working parts such as valves, absorber cylinders, restrictors and such like.

For this reason, such previously known braking systems are normally rather large and require a large number of joints, conduits and so on which are easily damaged or broken, and also are fairly expensive due to their complexity and the relatively long time required for assembly during manufacture.

OBJECT OF THE INVENTION

The object of the present invention is to provide an anti-skid braking system of the above mentioned type, that is having two modes of operation in dependence on the road conditions (wet or dry), in which the hydraulic actuator for anti-skid purposes is compact, efficient and of low cost in comparison with previously known such devices.

SUMMARY OF THE INVENTION

According to the present invention, there is provided an hydraulic anti-skid braking system for at least one wheel of a vehicle, comprising a reservoir for hydraulic fluid, a source of hydraulic braking pressure, a brake actuator controllable by the hydraulic braking pressure and connected to a distributor having an associated electrovalve which normally connects the distributor to the source of braking pressure, and an anti-skid control arrangement including a device sensitive to the dynamic state of the wheel and operating to produce a signal to energize the electrovalve when an incipient skid is detected, the electrovalve operating, when energized, to open a route through the distributor to connect the brake actuator to the reservoir, characterized in that the distributor comprises a distributor body having a first chamber communicating through a first passageway with a first port of the electrovalve and through an outlet port with the brake actuator, a second chamber having a port connected to the reservoir, a third chamber communicating through a second passageway in the distributor body with a second port of the electrovalve, through a first restrictor throttle with the reservoir, and through a third passageway with the second chamber, the distributor body having a cylindrical bore within which is slidable a piston which has a first axial extension projecting into the first chamber and a second axial extension projecting into the second chamber and which is biased by resilient biasing means to a first position in which the first axial extension engages a valve shutter in the said first chamber to hold the shutter in a position where it allows fluid flow through the first chamber to the said outlet port to the brake actuator, the resilient biasing means being such as to allow the piston to move from the first position to a second position, when the pressure in the first chamber exceeds a predetermined threshold value, to allow the valve shutter to close to restrict fluid flow from the first chamber to the said outlet port to pass through a second restrictor throttle which is formed therein, the third passageway being controlled by a ball valve which allows fluid flow between the second chamber and the third chamber when the piston is in the first position, and which is closed by the second extension of the piston when the piston is in the second position, the third chamber containing a cushion filled with a compressible fluid which allows the third chamber to have a variable capacity in dependence on the pressure of fluid therein.

Other features and advantages of the invention will become more apparent during the course of the following description with reference to the accompanying drawings which is given purely by way of nonrestrictive example.

DESCRIPTION OF THE PREFERRED EMBODIMENT

Figure 1:
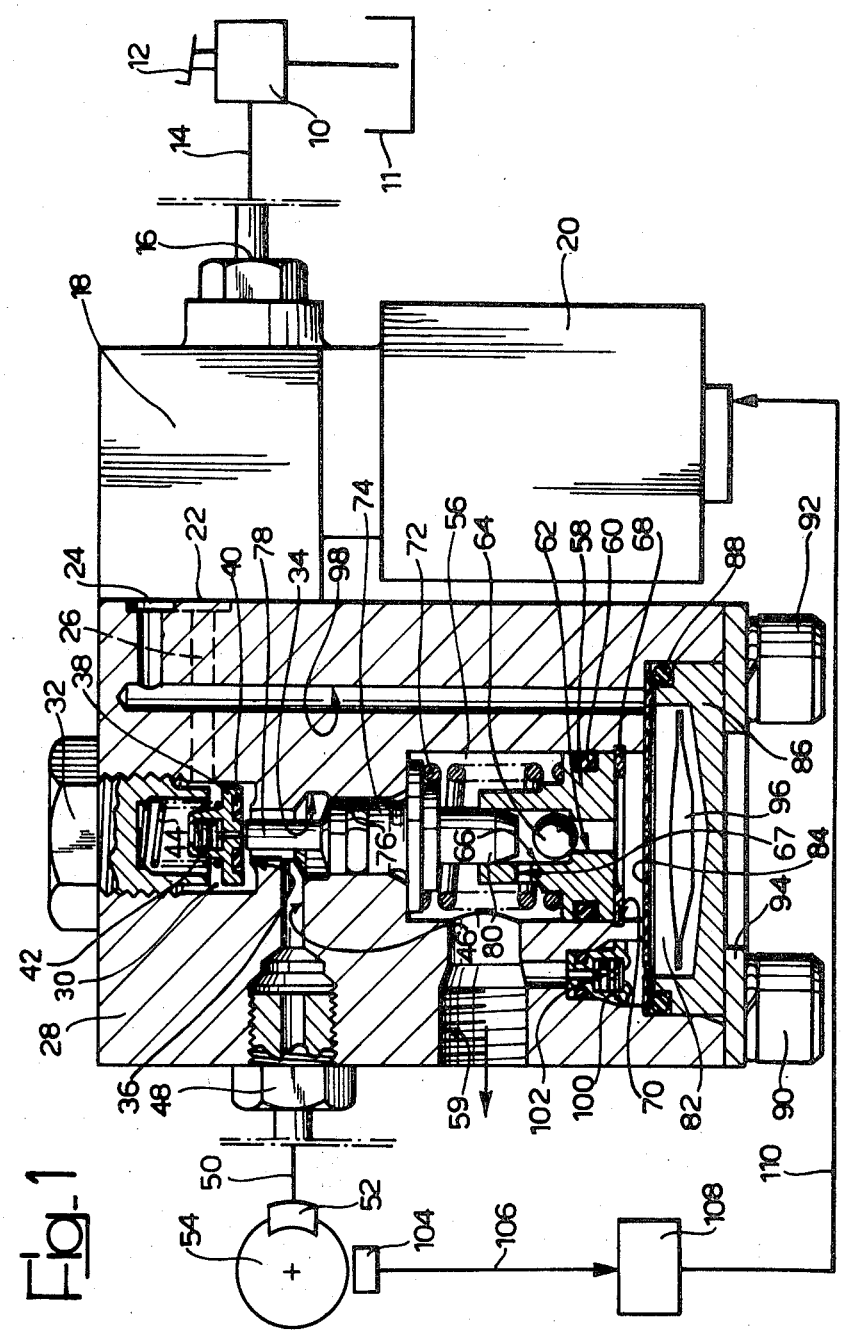
FIG. 1 is a partially diagrammatic view of an anti-skid system formed as an embodiment of this invention, including a partially sectioned representation of an anti-skid hydraulic actuator according to this invention.

Referring now to FIG. 1 the system is shown in a position which may be considered as the normal or "upright" position, and will be described in this orientation. It will be appreciated, however, that the circuit components could be installed in any suitable alternative position. The system comprises a source of hydraulic pressure 10 which is operable to draw hydraulic fluid from a reservoir 11 under the control of a pedal 12 to pump it into a conduit 14 which leads to an input port 16 of an electrically operated valve 18 having control solenoid 20, such electrically operated valves will be referred to hereinafter as electrovalves. The electrovalve 18 is normally in a position to allow communication between the input port 16 and a first output port 22. When the solenoid 20 is energized the electrovalve 18 moves to allow communication between the first output port 22 and a second output port 24.

The first output port 22 of the electrovalve 18 is connected to a conduit 26 of a distributor valve generally indicated 28. The conduit 26 leads to a cylindrical chamber 30 which is closed at the top (in the orientation shown in FIG. 1) by a threaded plug 32 and has a passageway 34 leading from the bottom for the passage of fluid. The passageway 34 is formed with a valve seat 36. The cylindrical chamber 30 contains a valve float 38 operable as a valve shutter, which is provided with a sealing ring 40 for engagement with the valve seat 36, and traversed axially by a throttled orifice 42. A light spring 44 presses on the shutter 38 to bias it lightly against the valve seat 36.

A passageway 46 of the distributor 28 extends transversely from the passageway 34 and communicates through a union 48 with a delivery conduit 50 which leads to a brake actuator 52 operating on a brake disc 54 mounted for rotation with a wheel of the vehicle (not shown).

The passageway 34 connects the cylindrical chamber 30 to a lower cylindrical chamber 56 which is closed at the bottom by a plug 58 having a sealing ring 60. The plug 58 also has an axial port 62 which is closable by a small ball valve 64 which is housed in a guideway 66 formed in the plug 58 coaxial with the port 62. In the wall of the guideway 66 there is a passageway 67 communicating with the chamber 56, and in the side wall of the chamber 56 there is an outlet opening 59 which is connected to the reservoir 11 (in FIG. 1 this connection is not shown in order not to complicate the drawing).

The plug 58 is held in position in the chamber 56 by a circlip 68 housed in an annular groove 70 and is restrained against upward axial displacements by the action of a compression spring 72 which extends between the plug 58 and a radial flange on a piston 74 which is slidable in the passageway 34 and provided with a sealing O-ring 76, and which has an upper axial projection 78 which extends into the passageway 34 and terminates close to the valve shutter 38, and a lower axial projection 80 which extends into the guideway 66 and terminates adjacent the ball valve 64.

The piston 74 is normally held by the compression spring 72 in a first position in which its upper extension 78 engages the valve shutter 38, to hold it away from the valve seat 36 so that the passage from the upper chamber 20 through the passageway 34 to the delivery conduit 46 of the distributor 28 is held open. The compression spring 72 is such that it will yield only to a force greater than a predetermined threshold value.

When the pressure in the top chamber 30 and in the passageway 34 exceeds the said predetermined threshold value the piston 74 is moved down towards a second position in which the upper extension 78 moves away from the shutter 38, enables it to approach the valve seat 36 under the action of the compression spring 44 and the hydraulic pressure in the chamber 30 to interrupt the free flow of fluid from the chamber 30 to the passageway 34 but allowing a restricted flow through the orifice 42. In this second position of the piston 74, the lower extension 80 engages the ball valve 64, to press it against the port 62 thereby closing this port.

A third chamber 82 of the distributor 28 is located below the chamber 56 from which it is separated by a perforated diaphragm 84. The bottom of the chamber 82 is closed by a "bell" plug 86, having a sealing ring 88. The "bell" plug 86 is held in the body of the distributor 28 by a ring 94 which is held in position by bolts 90,92.

In the chamber 82 there is a cushion 96 of synthetic elastic material which is filled with a fluid of high compressibility such as the fluid sold under the trade name FREON 20 or FREON 30 or other suitable fluid.

The chamber 82 communicating at one side, through the perforations of the diaphragm 84, with a conduit 98 which leads to the output port 24 of the electrovalve 18, and at the other side, again through the perforations of the diaphragm 84, with a conduit 100 in which there is located a constriction 102. The conduit 100 communicates with the outlet opening 59 of the distributor 28.

A tachometric recorder 104 is associated with the disc 54 of the wheel (not shown) of the vehicle and is sensitive to the rotation thereof to provide a signal on a line 106, representing the instantaneous velocity of the wheel of the vehicle. The velocity signal is fed to a control circuit 108 of known type which supplies control signals to the electrovalve 18 through a line 110 if such are required, during a braking operation, as will be described below.

OPERATION

When the brake pedal 12 is operated to effect a braking operation of the vehicle, the hydraulic circuit described may operate in various different ways depending on the type of ground over which the vehicle is travelling, which determines whether or not the anti-skid control circuit 108 operates to excite the solenoid 20.

The element which determines the discrimination between the two possible modes of operation of the hydraulic circuit is the spring 72 the calibration of which corresponds to a discrimination pressure $P_0$ in the chamber 30 and/or in the passageway 34. On ground of low coefficient of friction, which may be slippery due to being wet or icy, the pressure in the chamber 30 is maintained lower than the value $P_0$ for the whole of a braking operation. On the other hand, the braking pressure may exceed the valve $P_0$ when the ground has high coefficient of friction, for instance a dry asphalt ground.

When the brake is operated on slippery ground the pressure applied from the hydraulic pressure source 10 through the conduit 14 passes through the electrovalve 18 from its input port 16 to the output port 22 from where it passes through the passageway 26 of the distributor 28 to the upper chamber 30. Providing the pressure does not rise above the value $P_0$, the piston 74 is held in its first position in which the upper extension 78 keeps the shutter 38 separated from the valve seat 36 so that the fluid passes freely to the passageway 46 and thence to the brake actuator 52 via the delivery conduit 50.

Figure 2:
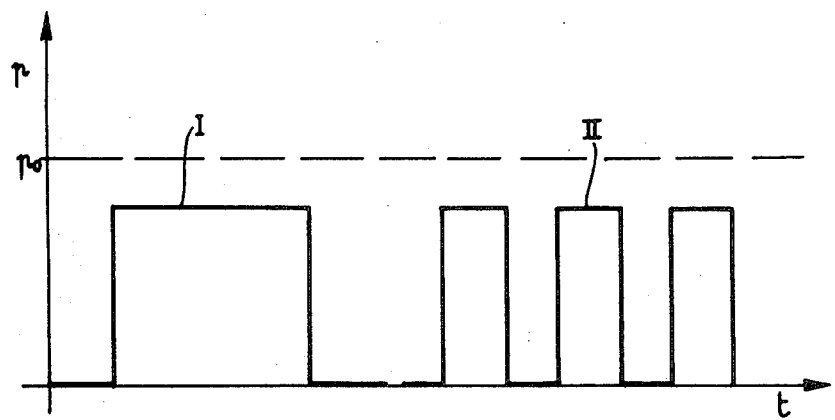
FIGS. 2 and 3 are diagrams showing the variation of the braking pressure as a function of time, for different modes of operation of the braking system of FIG. 1.

If the braking action is not sufficiently hard to create a situation of incipient skid and locking of the wheels so that the anti-skid control device 108 remains inactive, pressure is maintained on the caliper brake 52 until the pedal 12 is released. When the pedal is released, the fluid returns along the same path through the source 10 (which may be a master cylinder), and is discharged to the reservoir 11. A typical variation of the braking pressure with time in this situation is shown in FIG. 2 curve I.

On the other hand, if during the braking and whilst the pedal is being depressed there arises a situation of incipient locking of the wheel, this will be detected by the anti-skid control circuit 108 from the signals from the tachometer 104. The control circuit 108 operates to pass a control signal to the solenoid 20 to actuate the valve 18. The input port 16 of the valve 18 is then closed and the output port 22 which was connected to the input port 16 is connected to the other output port 24. The braking pressure is then released from the brake actuator 52 along a path including the conduit 50, the passageway 46, the chamber 30 (the shutter 38 being raised), the passageway 26 to the port 22 in the valve 18, which is connected to the port 24 from thence along the passageway 98 to the chamber 82. This chamber has a variable capacity due to the presence of the cushion 96. However, in this case the fluid merely continues to discharge freely from the chamber 82 through the perforated diaphragm 84, and the port 62, past the ball valve 64, which is free to allow such a flow, the piston being in the upper position, through the passage 67 and thence to the reservoir 11. The entire discharge path is substantially free from any significant hydraulic resistance so that the discharge happens practically instantaneously.

When the wheel is no longer in the imminent locking situation, the anti-skid control device 108 returns the electrovalve to its normal position so that pressure is again applied to brake actuator 52 if the brake pedal 12 is still depressed. This cycle of operations repeats indefinitely for as long as the braking operation continues, each time that it becomes necessary due to incipient locking of the wheels. Typical braking pressure variations over several cycles of this type are represented in FIG. 2 by the curve II. It will be appreciated that the curves are somewhat idealized for the sake of clarity, rapid increases and decreases in pressure being shown as substantially instantaneous, this would not be the case in practice where, even though rapid, such pressure changes would nevertheless take place over a certain time interval.

When a braking operation takes place as the vehicle is travelling over ground with high coefficient of friction, such as dry ground, the braking pressure may exceed the value $P_o$. If the brakes are applied hard so that the braking pressure exceeds the value $P_o$, but not so hard that an incipient skid develops to cause the intervention of the anti-skid control device 108 the braking pressure variation with time is typically as shown by the curve III of FIG. 3. The fluid pressure is transmitted from the pressure source 10 to the brake actuator 52 along the same path as described above until reaching the value $P_o$; this is represented by the line AB curve III. When the pressure $P_o$ is exceeded, the piston 74 is moved to its lower position by the pressure in the chamber 30 and the passageway 34. The valve shutter 38 then moves down onto the valve seat 36. Fluid flow still continues to pass from the chamber 30 to the passageway 46 but must now pass through the restrictor orifice 42; this is represented by the line BC of curve III.

Movement of the piston 74 to its lower position moreover, thrusts the ball valve 64 against its valve seat thus modifying the route of fluid should the anti-skid control device 108 operate, although this modification takes place regardless of whether the wheels of the vehicle are in an incipient skid situation or whether the anti-skid control device 108 operates or not. The result of this modification will be described below in connection with a further mode of operation of this circuit.

When the brake pedal 12 is released the fluid under pressure from the brake actuator 52 returns through the conduits 50 and 46, urges the valve shutter 38 upwards and thus passes freely to the chamber 30, from there to the passageway 26, through the electrovalve 18 to the conduit 14 and then to the reservoir 11. This is represented by the line CD of curve III of FIG. 3.

Figure 3:
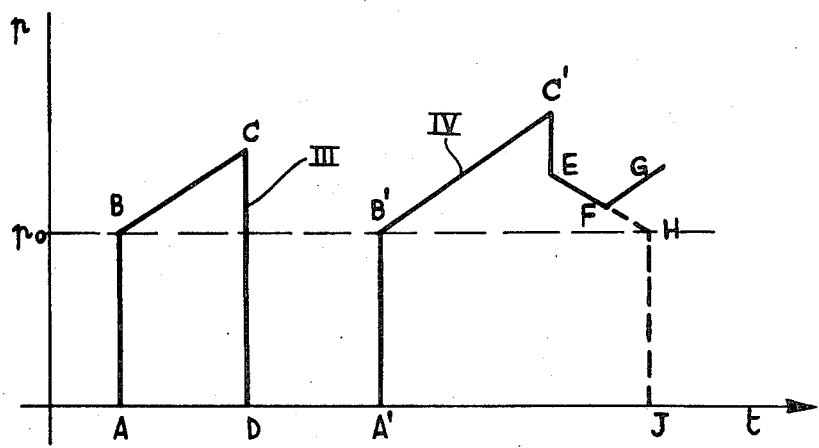

If, however, during a braking operation upon dry ground, there arises a situation of incipient locking of the wheel, such as to cause intervention by the anti-skid control device 108, after the braking pressure has risen above the pressure $P_o$, as shown for example, by the line B'C' of curve IV of FIG. 3, the circuit operates as follows. When the incipient skid is detected the anti-skid device 108 excites the solenoid 20 which moves to connect the port 22 of the electrovalve 18 to the port 24 thereof, thereby isolating the source 10 as before. The fluid then discharges from the brake actuator 52 through the conduit 50, the passageway 46, and 34, raising the valve shutter 38 and discharging freely to the passageway 26 from which it passes through the electrovalve 18 and out through the port 24 and along the passageway 98 to the chamber 82. Discharge from the chamber 82 through the opening 62, passage 66 and orifice 67 is not possible because the piston 74 is in the lower position, the pressure being greater than $P_o$ where it presses the ball valve 64 to block the opening 62. Therefore the fluid 82 displaces the cushion 96 to increase the capacity of the chamber 82 and cause a fall in pressure, as shown by the line C'E of the curve IV of FIG. 3. When the capacity of chamber 82 has been increased to its maximum, corresponding to maximum compression of the cushion 96, discharge of the fluid to the reservoir 11 continues through the perforated diaphragm 84, the restrictor orifice 102 and the port 59. This discharge occurs gradually due to the restrictor orifice 102 and is represented by the line EH of curve IV of FIG. 3.

At any time while the fluid is discharging through the orifice 102 and the braking pressure is falling gradually, the anti-skid control device 108 may de-excite the solenoid 20 due to the fact that the wheels are no longer in an incipient skid situation, this reconnects the hydraulic pressure delivery circuit from the source 10 to the brake actuator 52 and the pressure in the circuit again starts to rise. This is shown in curve IV of FIG. 3 by a line FG. From the point F the pressure starts to increase again with gradual effect since the pressure is still greater than the value $P_o$ so that the piston 74 is still in the lower position and fluid flow has to pass through the restrictor throttle 42. Such interruption of the control signal to the solenoid 20 could occur at any point whatever along the discharge curve, although the point indicated by way of example in the drawing represents a situation which is, ideally, encountered in practice, if the circuit is correctly adjusted.

If the control signal from the anti-skid arrangement 108 is not interrupted beforehand, that is if the incipient skidding situation remains, the discharge of fluid through the throttle 102 continues until the pressure in the passageway 34 and in the chamber 30 falls below the value $P_o$ whereupon the piston 74 moves upwards releasing the ball valve 64 and allowing the fluid to discharge rapidly through the opening 62, the port 67 and the port 59 in a practically instantaneous manner. In FIG. 3 this is represented by the lines EH and HJ.

It is understood that the modes of operation described and illustrated represent only a few typical situations and idealized pressure variations since practical variations will be extremely variable depending on the manner in which the brake pedal 12 is operated by the driver, the duration of the braking, type of and variations in the ground over which the vehicle travels during the braking. However, the examples described will serve to illustrate the general mode of operation of the braking system described. Similarly, although described in relation to only one wheel of a vehicle, it will be appreciated that the system could, and in practice would, be arranged to control the brakes on all the wheels of the vehicle although for economy the anti-skid control circuit 108 and tachometer 104 may only be positioned to detect the state of one of the wheels of the vehicle.

I claim:

1. In a hydraulic anti-skid braking system for at least one wheel of a vehicle, of the type comprising:
hydraulic reservoir means containing hydraulic fluid,
a source of hydraulic braking pressure,
means connecting said source of hydraulic braking pressure to said hydraulic reservoir means,
distributor valve means,
at least one hydraulic braking actuator on said wheel,
means connecting said distributor valve means to said at least one hydraulic braking actuator, means connecting said distributor to said source of fluid pressure, and means connecting said distributor to said reservoir means,
an electrovalve, means operatively connecting said electrovalve to said distributor whereby said distributor normally connects said source of braking pressure to said braking actuator,
anti-skid control means operatively connected to sense when said wheel is in an incipient skid state, means connecting said anti-skid control means to said electrovalve, said anti-skid control means producing a signal when said wheel is in an incipient skid state whereby said electrovalve controls said distributor valve means to connect said at least one braking actuator to said reservoir means to release said braking pressure,
the improvement wherein said distributor valve means comprises:
a distributor valve body, means defining a first chamber in said distributor valve body, means connecting said first chamber to said brake actuator, means defining a first passageway in said distributor valve body, said first passageway communicating with said first chamber,
means defining a first port in said electrovalve, said first passageway in said distributor body communicating with said first port in said electrovalve,
means defining a second chamber in said distributor body, means connecting said second chamber to said reservoir means,
means defining a third chamber in said distributor body,
means defining a second passageway in said distributor body, said second passageway in said distributor body communicating with said third chamber in said distributor body,
means defining a second port in said electrovalve, said second passageway in said distributor body communicating with said second port in said electrovalve,
means defining a first restrictor throttle in said distributor valve body, said restrictor throttle connecting said third chamber in said distributor body with said means connecting said second chamber to said reservoir means,
means defining a third passageway in said distributor body, said third passageway connecting said third chamber to said second chamber,
means defining a cylindrical bore in said distributor body,
a piston sliding in said cylindrical bore, said piston having first and second axial extensions thereof which respectively extend into said first and second chambers in said distributor body,
resilient biasing means biasing said piston to a first position in said cylindrical bore,
valve shutter means in said first chamber, said valve shutter means having second restrictor throttle means therein and being engaged by said first axial extension of said piston when said piston is in said first position and held in an open position to allow fluid flow through said first chamber from said first passageway in said distributor to said means connecting said first passageway to said brake actuators, said resilient biasing means allowing said piston to move from said first position to a second position when the hydraulic pressure in said first chamber is greater than a predetermined threshold pressure, said valve shutter means closing when said piston is in said second position to restrict the flow of fluid through said first chamber from said first passageway to said means connecting said first chamber to said brake actuator to pass through said second restrictor throttle means,
a ball valve in said third passageway, said ball valve allowing fluid flow between said second chamber and said third chamber when said piston is in said first position, said second axial extension of said piston engaging said ball valve when said piston is in said second position to prevent said communication between said second chamber and said third chamber, and
compressible cushion means in said third chamber, said third chamber having a variable capacity in dependence on the pressure of fluid therein by virtue of said compressible cushion whereby said third chamber acts as a capacity to absorb fluid from said at least one brake actuator means when said pressure in said first chamber exceeds said predetermined threshold and said anti-skid control device operates to control said electrovalve to connect said first passageway in said distributor valve body to said second passageway in said distributor valve body whereby said at least one brake actuator means is connected to said third chamber and through said first restrictor throttle to said reservoir.

2. A distributor valve for an automobile hydraulic anti-skid braking system of the type comprising:
hydraulic reservoir means containing hydraulic fluid,
a source of hydraulic braking pressure,
means connecting said source of hydraulic braking pressure to said hydraulic reservoir means,
distributor valve means,
at least one hydraulic braking actuator on said wheel,
means connecting said distributor valve means to said at least one hydraulic braking actuator, means connecting said distributor to said source of fluid pressure, and means connecting said distributor to said reservoir means,
an electrovalve, means operatively connecting said electrovalve to said distributor whereby said distributor normally connects said source of braking pressure to said braking actuator,
anti-skid control means operatively connected to sense when said wheel is in an incipient skid state, means connecting said anti-skid control means to said electrovalve, said anti-skid control means producing a signal when said wheel is in an incipient skid state whereby said electrovalve controls said distributor valve means to connect said at least one braking actuator to said reservoir means to release said braking pressure, said distributor valve means comprising:

a. a distributor valve body, means defining a first chamber in said distributor valve body, means for connecting said first chamber to said brake actuator, means defining a first passageway in said distributor valve body, said first passageway communicating with said first chamber, b. means defining a first port in said electrovalve, said first passageway in said distributor body communicating with said first port in said electrovalve, c. means defining a second chamber in said distributor body, means for connecting said second chamber to said reservoir means, d. means defining a third chamber in said distributor body, e. means defining a second passageway in said distributor body, said second passageway in said distributor body communicating with said third chamber in said distributor body, f. means defining a second port in said electrovalve, said second passageway in said distributor body communicating with said second port in said electrovalve, g. means defining a first restrictor throttle in said distributor valve body, said restrictor throttle connecting said third chamber in said distributor body with said means for connecting said second chamber to said reservoir means, h. means defining a third passageway in said distributor body, said third passageway connecting said third chamber to said second chamber, i. means defining a cylindrical bore in said distributor body, j. a piston sliding in said cylindrical bore, said piston having first and second axial extensions thereof which respectively extend into said first and second chambers in said distributor body, k. resilient biasing means biasing said piston to a first position in said cylindrical bore, l. valve shutter means in said first chamber, said valve shutter means having second restrictor throttle means therein and being engaged by said first axial extension of said piston when said piston is in said first position and held in an open position to allow fluid flow through said first chamber from said first passageway in said distributor to said means for connecting said first passageway to said brake actuators, said resilient biasing means allowing said piston to move from said first position to a second position when the hydraulic pressure in said first chamber is greater than a predetermined threshold pressure, said valve shutter means closing when said piston is in said second position to restrict the flow of fluid through said first chamber from said first passageway to said means for connecting said first chamber to said brake actuator to pass through said second restrictor throttle means, m. a ball valve in said third passageway, said ball valve allowing fluid flow between said second chamber and said third chamber when said piston is in said first position, said second axial extension of said piston engaging said ball valve when said piston is in said second position to prevent said communication between said second chamber and said third chamber, and n. compressible cushion means in said third chamber, said third chamber having a variable capacity in dependence on the pressure of fluid therein by virtue of said compressible cushion whereby said third chamber acts as a capacity to absorb fluid from said at least one brake actuator means when said distributor is connected into an anti-skid braking circuit and said pressure in said first chamber exceeds said predetermined threshold and said anti-skid control device operates to control said electrovalve to connect said first passageway in said distributor valve body to said second passageway in said distributor valve body whereby said at least one brake actuator means is connected to said third chamber and through said first restrictor throttle to said reservoir.

3. An hydraulic distributor for an anti-skid braking system of the type comprising a reservoir for hydraulic fluid, a source of hydraulic braking pressure, a brake actuator controllable by the hydraulic braking pressure and connected to the distributor which has an associated electrovalve which normally connects the distributor to the source of braking pressure, and an anti-skid control arrangement including a device sensitive to the dynamic state of the wheel and operating to produce a signal to energize the electrovalve when an incipient skid is detected, the electrovalve operating, when energized, to open a route through the distributor to connect the brake actuator to the reservoir, in which the distributor comprises a distributor body having a first chamber communicating through a first passageway with a first port of the electrovalve and having an outlet port connectable to the brake actuator, a second chamber having a port connectable to the reservoir, a third chamber communicating through a second passageway in the distributor body with a second part of the electrovalve, through a first restrictor throttle with the reservoir, and through a third passageway with the second chamber, the distributor body having a cylindrical bore within which is slidable a piston which has a first axial extension projecting into the first chamber and a second axial extension projecting into the second chamber and which is biased by resilient biasing means to a first position in which the first axial extension engages a valve shutter in the said first chamber to hold the shutter in a position where it allows fluid flow through the first chamber to the said outlet port, the resilient biasing means being such as to allow the piston to move from the first position to a second position, when the pressure in the first chamber exceeds a predetermined threshold value, to allow the valve shutter to close to restrict fluid flow from the first chamber to the said outlet port to pass through a second restrictor throttle which is formed therein, the third passageway being controlled by a ball valve which allows fluid flow between the second chamber and the third chamber when the piston is in the first position, and which is closed by the second extension of the piston when the piston is in the second position, the third chamber containing a cushion filled with a compressible fluid which allows the third chamber to have a variable capacity in dependence on the pressure of fluid therein.

* * * * *